US007708133B2

(12) United States Patent
Williams

(10) Patent No.: US 7,708,133 B2

(45) Date of Patent: May 4, 2010

(54) FLEXIBLE MEMBER TENSIONING

(75) Inventor: Martin R. Williams, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 907 days.

(21) Appl. No.: 10/703,739

(22) Filed: Nov. 7, 2003

(65) Prior Publication Data

US 2005/0147446 A1 Jul. 7, 2005

(51) Int. Cl.
*B65G 17/08* (2006.01)
*H04N 1/10* (2006.01)
*H04N 1/191* (2006.01)
*H04N 1/193* (2006.01)

(52) U.S. Cl. ............... 198/781.03; 198/809; 198/626.1; 198/626.3; 271/84; 358/497

(58) Field of Classification Search ................. 400/323, 400/335; 198/781.03, 809, 626.3
See application file for complete search history.

(56) References Cited

U.S. PATENT DOCUMENTS 4,395,151 A 7/1983 Krenz
4,653,948 A 3/1987 Ikeda
4,678,354 A 7/1987 Olsen
4,746,237 A * 5/1988 Takeda ........................ 400/335
4,927,004 A * 5/1990 Leaton ........................ 198/704
5,106,077 A * 4/1992 Kawaguchi et al. ......... 271/302
5,595,448 A 1/1997 Harada
5,632,369 A * 5/1997 Wadell ........................ 198/525
5,779,376 A * 7/1998 Seu ............................ 400/335
5,779,396 A * 7/1998 Mallon et al. ............... 405/264
6,478,403 B1 11/2002 Giles et al.
6,485,207 B1 11/2002 Allen et al.
6,485,383 B1 11/2002 Hendricks et al.
6,648,127 B2 * 11/2003 Molinaro et al. ......... 198/502.1
6,690,494 B1 * 2/2004 Yamada ...................... 358/497

* cited by examiner

*Primary Examiner*—Gene Crawford
*Assistant Examiner*—Kavel P Singh

(57) ABSTRACT

An apparatus in accordance with one embodiment of the present invention includes a driven roller and a idler roller each coupled with a flexible member. A pressure roller is also included and can be forced against the driven roller to tension the flexible member.

40 Claims, 3 Drawing Sheets

FLEXIBLE MEMBER TENSIONING

BACKGROUND

Flexible drive members (i.e. "flexible members"), including belts, chains, wires, and cables, are employed in a wide variety of devices to transmit mechanical power. One example of such a device that typically employs at least one flexible member is that of ah inkjet printer, wherein a flexible member can be employed to move and position the print head.

A typical flexible member is configured to be coupled, or wrapped at least partially around, one or more pulleys, or rollers, or sprockets, or the like. In order to function properly, at least some tension is generally maintained in the flexible member to prevent various undesirable effects associated with inadequately tensioned flexible members. Such undesirable effects can include slippage of the flexible member relative to the pulleys and the like.

Oftentimes, a mechanical power source, such as an electric motor having an output shaft with a pulley attached thereto, is coupled with a flexible member and is employed to drive or circulate the flexible member. In this manner, the mechanical power, and/or motion, produced by such an electric motor can be transmitted by the flexible member to another object or device.

Inasmuch as a considerable amount of tension must be maintained in the flexible member in some situations, such as in the case of a smooth or "friction" flexible member, the electric motor output shaft and/or the shaft bearings must be of an adequate size to withstand not only the forces produced by the output power of the motor, but also to withstand the additional forces resulting from the tension in the flexible member.

That is, at least in some situations, the force resulting from tension in a flexible member of a given system can have a considerable effect on the required size of the motor for that system. That is, in some systems that employ a tensioned flexible member, the size of a motor employed to drive the flexible member is generally specified front the standpoint of ensuring that the motor bearings and/or motor shaft are not overstressed by the additional forces resulting from the tension in the flexible member.

One result of this can be that oversized motors (i.e. motors having excessive power capacity) are utilized in systems employing relatively high-tensioned flexible members simply to ensure that the motor bearings and/or motor shaft are adequate for the forces produced by the tension in the flexible member. This results in inefficient use of motor capacity.

DETAILED DESCRIPTION

The present invention, in some embodiments, generally includes apparatus and methods for tensioning flexible member which acts as a drive member in a print head drive system that includes a driven roller that can be configured to be driven by a mechanical power source and that is operationally engaged, or coupled, with the flexible member. The print head drive system can be a portion of an imaging device. Apparatus in accordance with various embodiments of the invention include a pressure roller that is urged into forcible rolling engagement with the driven roller of a print head drive system. The pressure roller can be urged in a direction substantially opposite of the direction of a force imparted on the driven roller as the result of tension in the flexible member.

Figure 1:
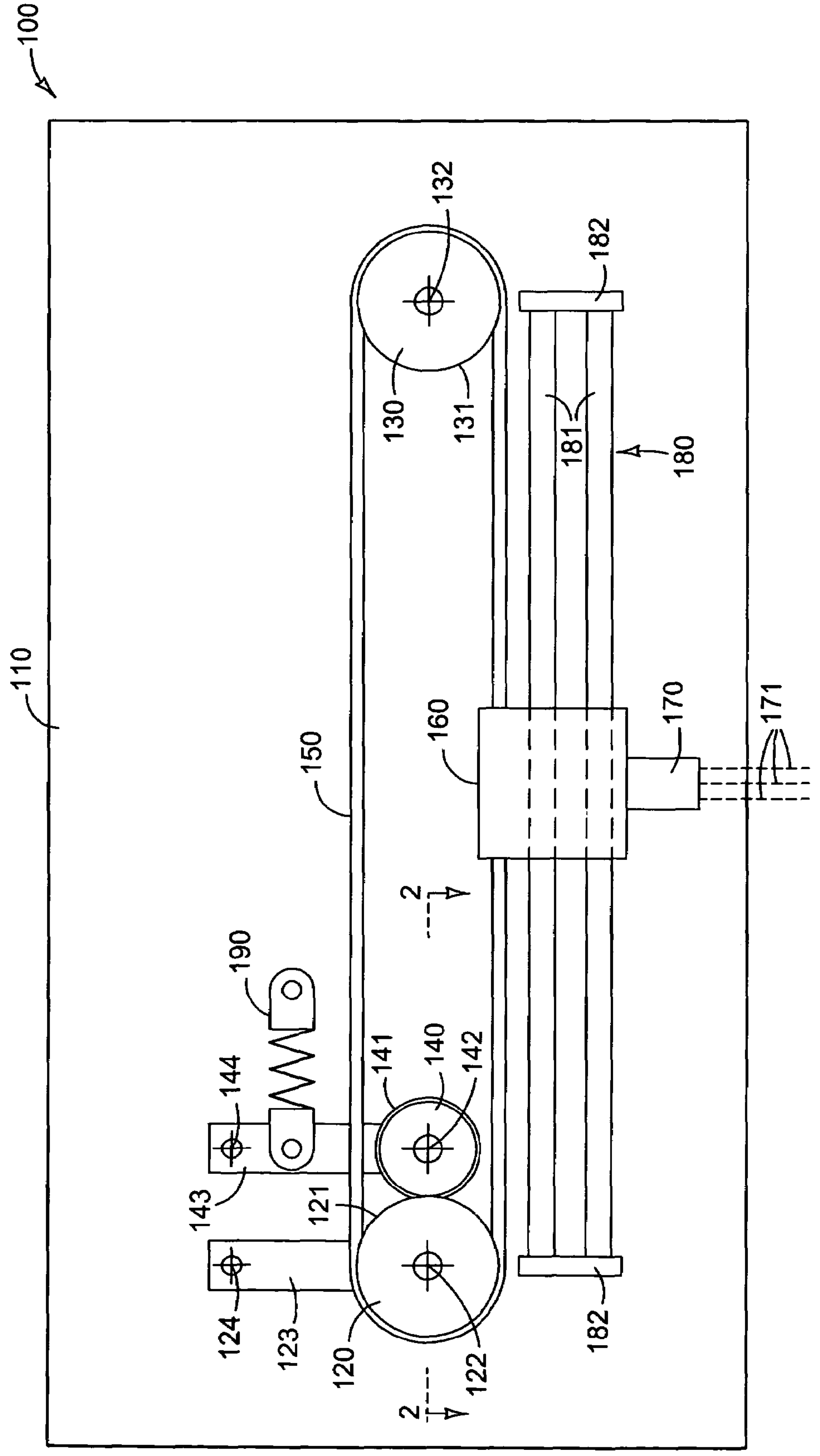
FIG. 1 is a schematic view in which an apparatus in accordance with one embodiment of the present invention is depicted.

Turning to FIG. 1, a schematic view is shown in which an apparatus 100 is depicted in accordance with one embodiment of the present invention. It is understood that only those components essential to the understanding of at least one embodiment of the present invention are shown in the various figures in the interest of clarity. That is, the apparatus 100 can be, for example, a print head drive system.

Alternatively, the apparatus.100 can be, for example, an imaging apparatus of which substantially only the print head drive system thereof is depicted, and in which case at least some conventional components required for the operation of the apparatus as an imaging apparatus have been omitted for clarity.

Inasmuch as FIG. 1 (as well as FIG. 3 discussed below) is a schematic representation, it is understood that the apparatus depicted thereby can be oriented in a number of possible manners relative to an overall imaging device or other device that incorporates the apparatus depicted in FIG. 1. That is, it is understood that FIG. 1 can be a top view, or a front view, or a side view, depending upon to overall configuration of the device into which the apparatus depicted by FIG. 1 is incorporated.

Still referring to FIG. 1, the apparatus 100 can include a chassis 110 on which other components can be operationally supported. For example, a driven roller 120 can be rotatably supported by the chassis 110 as is depicted. The driven roller 120 can be powered, or driven, by a mechanical power source (not shown), such as an electric motor, or the like. That is, although not depicted, a motor or other suitable mechanical power source can be provided so as to be coupled in mechanical power transmitting linkage to the driven roller 120.

The driven roller 120 can have an outer circumferential surface 121 defined thereon, as shown. The driven roller outer circumferential surface 121 can include any of a number of known features, such as flanges, cogs, and the like. That is, the driven roller 120 can be configured in the manner of a cylindrical roller, or pulley. The driven roller 120 can be rotatable about a corresponding axis of rotation 122. That is, the driven roller 120 is configured to be rotated, or be driven, about the associated axis of rotation 122 as is depicted.

The apparatus 100 can also include a driven roller support member 123. The driven roller support member 123 can be movably supported on the chassis 110. That is, the driven roller support member 123 can be supported by the chassis 110 such that, on the one hand, the driven roller support member is configured to be movable relative to the chassis, but on the other hand, the driven roller support member is configured to maintain a predetermined orientation of the driven roller relative to the chassis.

For example, the driven roller support member 123 can be configured to allow the driven roller axis of rotation 122 to move along a finite, continuous path (not shown), while also preventing any change in alignment of the driven roller axis of rotation. This can be accomplished by way of a number of possible manners. As a specific example, the driven roller support member 123 can be configured in such a manner as to pivot relative to the chassis 110 about an associated pivot point 124. In this manner, the driven roller axis of rotation 122 can be movable along an arcuate path (not shown) relative to the chassis 110, while the alignment of the driven roller axis of rotation is held constant.

It is to be understood that other configurations of the driven roller support member 123 are possible, although not specifically depicted herein. For example, the rather than being configured to pivot about an associated pivot point 124 that is fixed relative to the chassis 110, the driven roller support member 123 can be configured in the manner of a device that incorporates a slide mechanism which allows the driven roller axis of rotation 122 to move relative to the chassis 110 along a substantially straight and continuous path (not shown).

Regardless of the specific configuration of the driven roller support member 123, a mechanical power source (not shown) that can be employed to drive the driven roller 120, as is explained above, can also be supported on the driven roller support member along with the driven roller. Alternatively, such a mechanical power source can be supported by other means.

For example, such a mechanical power source can be supported in a substantially fixed position on the chassis 110, or the like, while the driven roller 120 remains movable relative to the chassis. In the latter situation, a flexible coupling (not shown), or transmission mechanism, can be employed to couple the mechanical power source to the driven roller 120 for mechanical power transmission therebetween while also enabling changes in relative positions with respect to the driven roller and the power source.

The apparatus 100 also includes an idler roller 130. The idler roller 130 can have an outer circumferential surface 131 defined thereon in the manner of the driven roller 120 as is discussed above. That is, the idler roller 130 can generally be configured in a manner substantially similar to that of the driven roller 120 discussed above, although the idler roller is not driven. For example, the idler roller 130 can be configured generally in the manner of typical rollers and/or pulleys.

More specifically, the idler roller 130 is supported by the chassis 110 and is configured to be substantially freely rotatable about an associated axis of rotation 132. The idler roller axis of rotation 132 can be fixed relative to the chassis 110, as is depicted. However, as is explained below with reference to other embodiments of the present invention, the idler roller axis of rotation 132 can be movable relative to the chassis 110 as in the manner of the driven roller axis of rotation 122 which is discussed above. Moreover, the driven roller axis of rotation 122 can be substantially parallel to the idler roller axis of rotation 132.

The apparatus can further include a carriage 160. The carriage 160 is movably supported by the chassis 110 and is also configured to traverse back and forth along a given path (not shown) that is substantially fixed relative to the chassis. The carriage 160 can be substantially similar to typical carriages employed in conjunction with conventional imaging apparatus and the like.

A print head 170 can be included in the apparatus 100 and can be supported on the carriage 160, whereby the print head is movable relative to the chassis 110 along with the carriage. The print head 170 is configured to selectively eject ink droplets 171 in a given direction while the carriage is moving relative to the chassis. It is understood that, inasmuch as FIG. 1 (as well as FIG. 3 discussed below) is a schematic drawing, the depiction therein of the ink droplets 171 is intended solely to provide assistance in recognition of the print head 170 as a print head. That is, it is understood that the orientation of the ink droplets 171, and/or the path thereof, relative to the apparatus is not intended to limit the print head 170 to any specific configuration and/or orientation relative to the apparatus and/or to any other device into which the apparatus can be incorporated.

The print head 170 can be configured in the manner of typical print heads employed in conjunction with conventional imaging apparatus. Thus, the print head 170 together with various other components of the apparatus 100, in addition to various components which may not be specifically described and/or depicted herein, can form an image on a sheet of imaging media (not shown), wherein such an image is made up of the ink droplets 171. Such a process of forming an image from ink droplets 171 projected from the print head 170 can be performed while the print head is traversed back and forth while supported on the carriage 160.

As is also depicted in FIG. 1, a guide 180 can be included in the apparatus 100. The guide 180 can be supported on the chassis 110, wherein the guide movably supports the carriage 160, as shown. The guide 180 can include one or more rails or rods 181 on which the carriage 160 is slidably supported. The rails or rods 181 are aligned along a path (not shown) on which the carriage is configured to traverse relative to the chassis 110. The rails or rods 181 can be supported by one or more support brackets 182 that are in turn supported on the chassis 110.

The apparatus 100 also includes a flexible member 150. The flexible member 150 is configured to transmit mechanical power as is explained in greater detail below. The flexible member 150 can have any of a number of specific forms including those of a smooth friction belt, or a toothed, or cogged, synchronous belt, or a chain, or a cable, or a wire, for example. Regardless of the specific configuration of the flexible member 150, the flexible member is operationally engaged, or coupled, with the driven roller 120, the idler roller 130, and the carriage 160.

That is, the flexible member 150 is wrapped at least partially about both the driven roller 120 and the idler roller 130 such that at least some tension exists in the flexible member. The term "tension" as used herein is defined as the force within the flexible member when the flexible member is at rest, or static, wherein such force is the result of the relative positions of two or more pulleys or the like with which the flexible member is coupled. That is, the term "tension" is defined herein does not necessarily include stress and/or force within the flexible member that is the result of mechanical power transmission.

Still referring to FIG. 1, the flexible member 150 can be in contact with the driven roller circumferential surface 121 as well as the idler roller circumferential surface 131. It can be appreciated that the specific configuration, or type, of flexible member 150 can be a factor in the desired amount of tension in the flexible member. For example, smooth friction belts, regardless of the cross-sectional shape thereof (e.g., flat, round, "V"-shaped), as well as wires and cables, can generally require significantly more tension than synchronous belts (also known as "toothed belts" or "cogged belts") or chains.

Regardless of the specific type or configuration of the flexible member 150, the manner of operational engagement of the flexible member with the driven roller 120, the idler roller 130, and the carriage 160, is such that a powered rotation of the driven roller 120 can result in circulation of the flexible member 150 about both the driven roller and the idler roller 130. As is mentioned above, the flexible member 150 is also operationally engaged, or coupled, with the carriage 160 in a manner whereby circulation of the flexible member about the driven roller 120 and about the idler roller 130 results in movement of the carriage relative to the chassis 110.

Thus, more specifically, the manner of the operational engagement, or coupling, of the driven roller 120, the idler roller 130, the flexible member 150, and the carriage 160, is such that a given amount of mechanical power transmitted to the driven roller from a mechanical power source (not shown) results in rotation of the driven roller, which in turn results in rotation of the idler roller and circulation of the flexible member about the driven roller and the idler roller, which in turn results in movement of the carriage 160 relative to the chassis 110.

As a specific example, the flexible member 150 can be fixedly connected to the carriage 160, whereby circulation of the flexible member about the driven roller 120 and the idler roller 130 causes movement of the carriage. However, it is to be understood that other means of engagement of the flexible member 150 with the carriage 160 may be employed, wherein the flexible member is not fixedly connected to the carriage, yet movement thereof is caused as the result of circulation of the flexible member about the driven roller 120 and the idler roller 130.

It is to be understood further that the specific circulatory path of the flexible member 150 can be varied. That is, the flexible member 150 can have any of a number of various types and/or shapes of circulatory paths, as long as the flexible member is operationally engaged, or coupled, with the driven roller 120, the idler roller 130, and the carriage 160, such that driven rotation of the driven roller results in movement of the carriage relative to the chassis 110.

With further reference to FIG. 1, it is seen that the apparatus 100 includes a pressure roller 140. The pressure roller 140 is supported by the chassis 110, and is configured to be substantially freely rotatable relative to the chassis about an associated axis of rotation 142. Furthermore, the pressure roller 140 can have an associated circumferential surface 141 defined thereon in the manner of the driven roller 120 as is discussed above.

As is further seen, the pressure roller 140 is configured to be in forcible rolling engagement with the driven roller 120. More specifically, the pressure roller 140 can be forced against the driven roller 120 in a manner wherein the driven roller axis of rotation 122 and the pressure roller axis of rotation 142 are substantially parallel to one another. Furthermore, inasmuch as the pressure roller 140 is in forcible rolling engagement with the driven roller 120, the pressure roller circumferential surface 141 can be in forcible contact with the driven roller circumferential surface 121.

Moreover, a pressure roller support member 143 can be included in the apparatus 100, and can be employed to movably support the pressure roller 140. That is, the apparatus 100 can include the pressure roller support member 143 which can be movably supported by the chassis 110 in the manner of the driven roller support member 123 as is described above. For example, the pressure roller support member 143 can be configured to pivot substantially freely about an associated pivot point 144. In turn, the pressure roller 140 can be supported by the pressure roller support member 143 while also being substantially freely rotatable relative thereto.

A biasing member 190 can also be included in the apparatus 100. The biasing member 190 is configured to urge the pressure roller 140 into forcible rolling engagement with the driven roller. Furthermore, the biasing member 190 can be configured to urge the pressure roller 140 in a direction away from the idler roller 130. The biasing member 190 can be connected to the pressure roller support member 143 in the manner depicted. That is, the biasing member 190 can be connected between the chassis 110 and the pressure roller support member 143, whereby the biasing member urges the pressure roller support member, along with the pressure roller 140, in a given direction relative to the chassis.

It is to be understood that the biasing member 190 can have different specific configurations and/or can include different specific components, including that of a mechanical spring, as is specifically depicted in FIG. 1. As yet further examples, the biasing member 190 can be substantially in the form of a selectively controllable actuator such as a pneumatically powered actuator, or a hydraulically powered actuator, or an electrically powered actuator. Moreover, a conventional controller (not shown) and associated actuator power source can be included and employed to control the amount of force produced by such a selectively controllable actuator, and thus the tension in the flexible member 150 can be controlled automatically.

Thus, with continued reference to FIG. 1, the idler roller axis of rotation 132 can have a fixed position relative to the chassis 110. Conversely, both the driven roller axis of rotation 122 and the pressure roller axis of rotation 142 can be movable relative to the chassis 110 by way of the driven roller support member 123 and the pressure roller support member 143, respectively. In other words, both the driven roller 120 and the pressure roller 140 can be moved away from the idler roller 130, while the location of the idler roller remains substantially fixed relative to the chassis 110.

Thus, the flexible member 150 can be wrapped about the driven roller 120 (i.e. coupled therewith) and the idler roller 130 as is shown, while the respective locations of the driven roller and of the pressure roller 140 are movable relative to the location of the idler roller. As is mentioned above, the flexible member 150 can also be connected to the carriage 160 is such a manner that the flexible member is substantially in the form of an endless loop that is stretched, or tensioned, between the driven roller 120 and the idler roller 130.

Such tensioning, or stressing, of the flexible member 150 can be the result of the pressure roller 140 being forcibly urged against the driven roller 120 in rolling engagement therewith by way of the biasing member 190. That is, the biasing member 190 is configured to produce a force that can be applied to urge the pressure roller 140 against the driven roller 120 so as to move the driven roller away from the idler roller 130, to thus provide tensioning of the flexible member 150.

Moreover, such a force provided by the biasing member 190 can be set and/or adjusted so as to provide a predetermined level of tension in the flexible member 150. For example, a level of tension can be determined such that the driven roller 120 can be selectively rotated by application of mechanical power thereto as described above without significant slippage of the flexible member 150 relative to the driven roller. This can result in an associated selective circulation of the flexible member 150 about the driven roller 120 and the idler roller 130, which in turn can result in selective movement of the carriage 160, and thus the print head 170, for production of an image or the like.

It is seen from a study of FIG. 1 that the driven roller 120 can be of a diameter that is substantially the same as a diameter of the idler roller 130. That is, the driven roller 120 and the idler roller 130 can be substantially of the same overall diameter. Furthermore, as is also seen from a study of FIG. 1, the pressure roller 140 can be of a diameter that is smaller than that of the driven roller 120. However, it is understood that other relative roller sizes can be employed in the alternative.

In the example depicted, the driven roller 120 and the idler roller 130 can be substantially the same diameter, and the pressure roller 140 can be of a diameter that is smaller than the diameters of both the driven roller and the idler roller. This can allow the pressure roller 140 to be located substantially between the driven roller 120 and the idler roller 130, wherein the driven roller axis 122, the idler roller axis 132, and the pressure roller axis 142, are substantially aligned with one another, and wherein the pressure roller does not come into contact with the flexible member 150.

Figure 2:
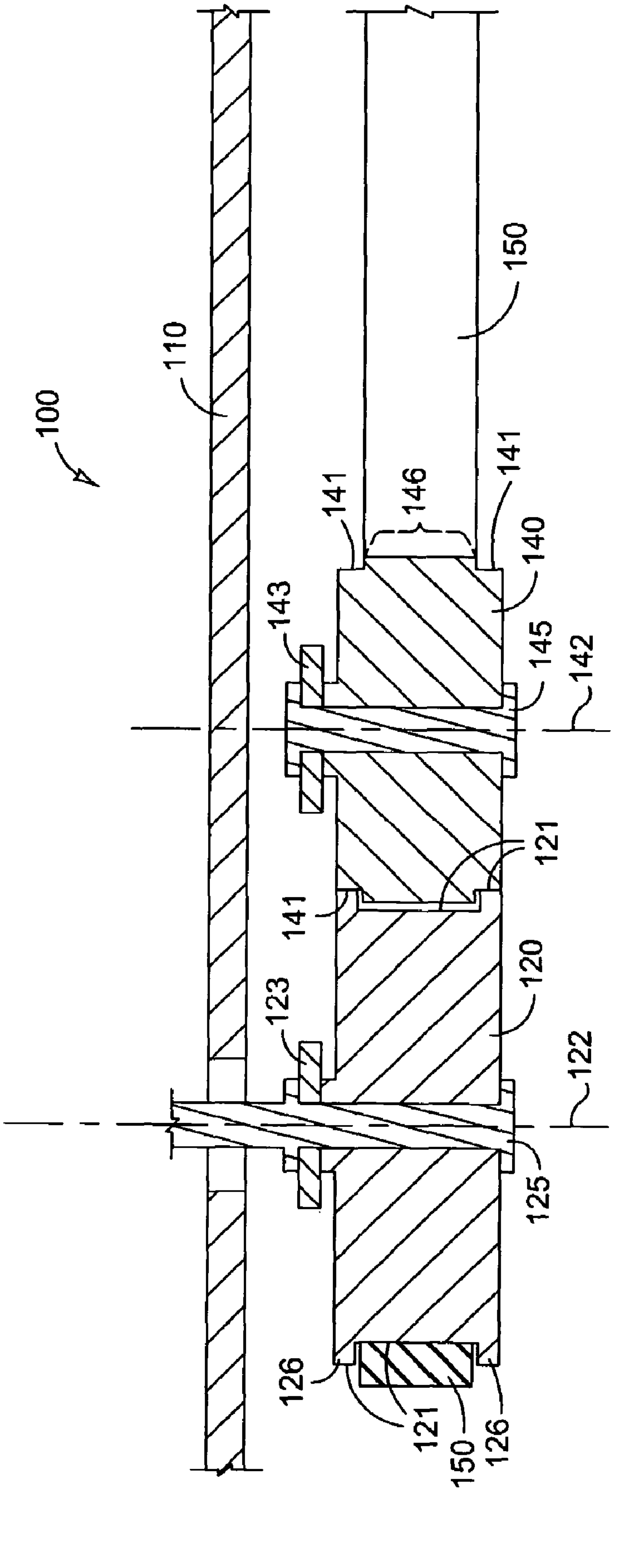
FIG. 2 is a sectional view taken through the driven roller and the pressure roller of the apparatus depicted in FIG. 1.

Moving now to FIG. 2, a sectional view is shown in which a portion of the apparatus 100 is depicted. Specifically, the sectional view shown in FIG. 2 is taken through the driven roller axis 122 and the pressure roller axis 142. As is seen from a study of FIG. 2, a driven roller axle pin 125, or the like, can be employed to rotatably support the driven roller 120 on the driven roller support member 123. Likewise, a pressure roller axle pin 145, or the like, can be employed to rotatably support the pressure roller 140 on the pressure roller support member 143.

The flexible member 150 is depicted as being as being at least partially wrapped about, or coupled with, the driven roller 120. As is further seen, a pair of flanges, 126 can be defined on the driven roller circumferential surface 121. The flanges 126 can serve to maintain alignment of the flexible member 150 relative to the driven roller 120. Moreover, the flexible member 150 can be nested between the pair of flanges 126 as is also shown. It is to be understood that the idler roller (shown in FIG. 1) can have defined thereon flanges similar to the driven roller flanges 121.

The pressure roller 140 can have defined thereon a pilot ridge 146. More specifically, the pilot ridge 146 can be in the form of a raised portion of the pressure roller circumferential surface 141. The pilot ridge 146 can be configured to substantially nested between the driven roller flanges 126, while the pressure roller circumferential surface 141 is in forcible rolling engagement, or contact, with the driven roller circumferential surface 121, as is seen from a study of FIG. 2. As can be appreciated, such nesting of the pilot ridge 146 between the flanges 126 can serve to maintain alignment of the driven roller 120 relative to the pressure roller 140.

As is yet further seen from a study of FIG. 2, and as is mentioned above, the driven roller axis 122 and the pressure roller axis 142 can be substantially parallel to one another. Moreover, both the driven roller support member 123 and the pressure roller support member 143 can be configured movably support the driven roller 120 and the pressure roller 140, respectively, such that the driven roller axis 122 and the pressure roller axis 142 remain substantially parallel to one another and remain in a substantially normal orientation relative to at least a portion of the chassis 110.

Figure 3:
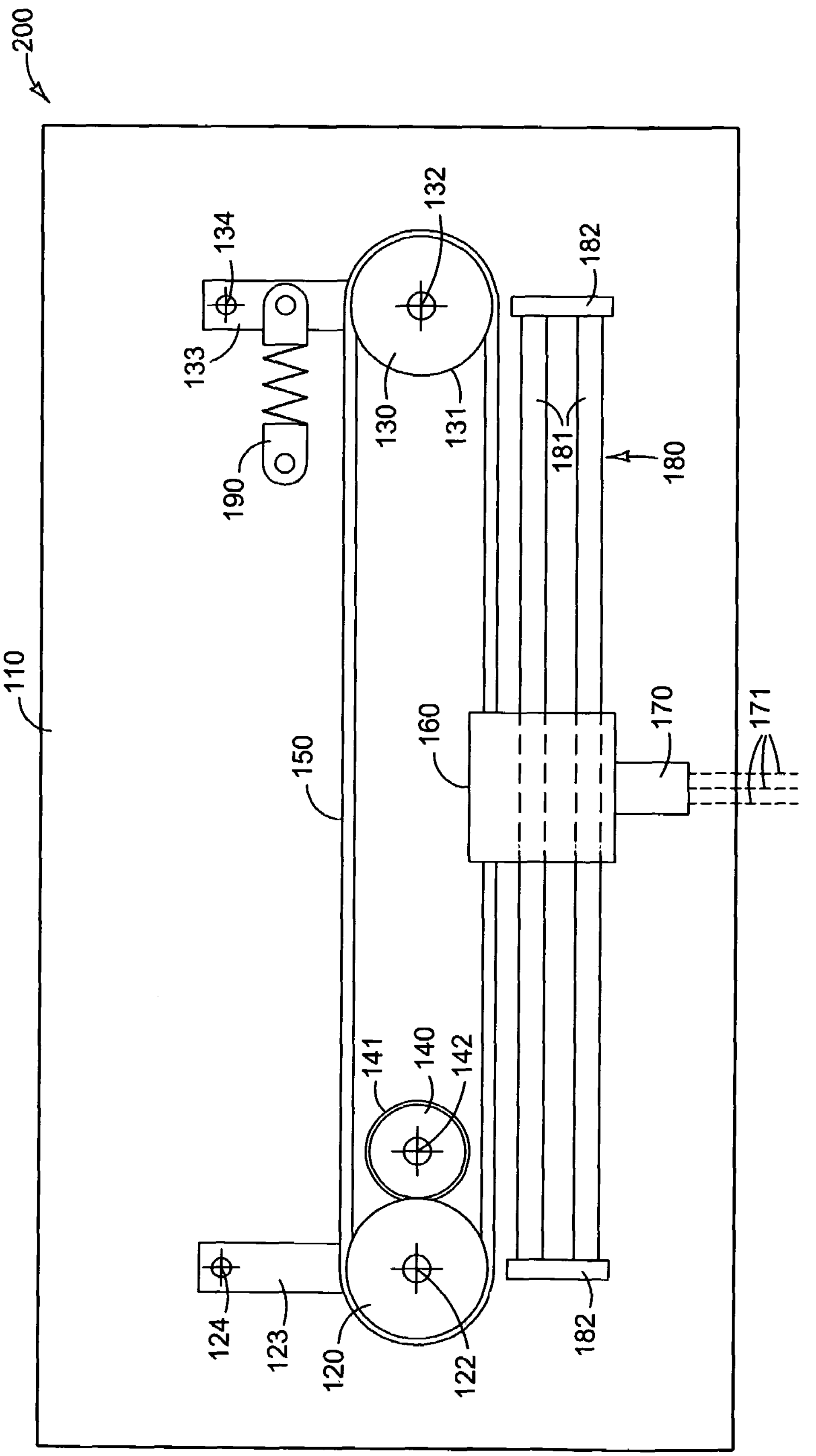
FIG. 3 is another schematic view in which an apparatus in accordance with another embodiment of the present invention is depicted.

Turning now to FIG. 3, a top view is shown in which an apparatus 200 is depicted in accordance with another embodiment of the present invention. The apparatus 200 can be, for example, a print head drive system. Alternatively, the apparatus 200 can be an imaging apparatus of which substantially only the print drive system thereof is depicted. From a study of FIGS. 1 and 3, it is seen that the apparatus 200 can be substantially similar to the apparatus 100, except for minor differences that are made apparent in the discussion below.

More specifically, as is seen from a study of FIGS. 1 and 3, the apparatus 200 can include substantially all of the components of the apparatus 100, except for the pressure roller support element 143. That is, with regard to the apparatus 200, an idler roller support member 133 can be included therein while the pressure roller support element 143 of the apparatus 100 can be omitted. In other words, the apparatus 100 can include all of the components of the apparatus 200 except for the idler roller support member 133, while the apparatus 200 can include all of the components of the apparatus 100 except for the pressure roller support member 143.

Still referring to FIGS. 1 and 3, another difference between the apparatus 100 and the apparatus 200 is that the biasing member 190 of the apparatus 100 can be operatively connected to the pressure roller support element 143, while the biasing member of the apparatus 200 can be operatively connected to the idler roller support element 133.

Moreover, with regard to the apparatus 100, the pressure roller axis 142 can be movable relative to the chassis 110, while the idler roller axis 132 can be fixed relative to the chassis. Conversely, with regard to the apparatus 200, the pressure roller axis 142 can be fixed relative to the chassis 110, while the idler roller axis 132 can be movable relative to the chassis. It is further noted that with regard to both the apparatus 100 and the apparatus 200, the pressure roller axis 122 can be movable relative to the chassis 110.

Focusing now on FIG. 3, a more detailed examination of the apparatus 200 reveals that the idler roller 130 can be rotatably supported by the idler roller support member 133. The idler roller support member 133 can, in turn, be movably supported by the chassis 110 such that the idler roller axis 132 is movable relative to the chassis along a given continuous path (not shown). The idler roller support member 133 can be configured in any of a number of possible manners so as to render the idler roller axis 132 movable relative to the chassis 110.

For example, the idler roller support member 133 can be movably supported by the chassis 110 so as to be capable of pivoting about an associated pivot point 134. In this manner, the idler roller axis 132 can be movable relative to the chassis 110 along an arcuate path of movement (not shown). Alternatively, the idler roller support member 133 can be configured in the manner of a slide device (not shown) so as to enable the idler roller axis 132 to move relative to the chassis 110 along a substantially straight path of movement (not shown).

Regardless of the specific configuration of the idler roller support member 133, the idler roller support member can be configured in a manner such that the idler roller axis 132 is maintained in a substantially constant orientation. That is, for example, the idler roller support member 133 can be configured in a manner such that the idler roller axis 132 is maintained in substantially parallel, alignment with the pressure roller axis 142, and/or with the driven roller axis 122.

As is mentioned briefly above, the biasing member 190 can be operatively connected with the idler roller support member 133. More specifically, the biasing member 190 can be operatively connected between the idler roller support member 133 and the chassis 110 as is depicted in FIG. 3. In this manner, the biasing member. 190 can exert a force against the idler roller support member 133 such that the idler roller 130 is urged away from the pressure roller 140.

As is also mentioned briefly above, the pressure roller 140 can be rotatably supported on the chassis 110 in a manner such that the pressure roller is rotatable about the pressure roller axis 142, and wherein the pressure roller axis is substantially fixed relative to the chassis. Furthermore, the driven roller 120 can be rotatably supported by the driven roller support member 123 in a manner such that the driven roller axis 122 is movable relative to the chassis 110 as is described above with respect to the apparatus 100 shown in FIG. 1.

As is further seen with reference to FIG. 3, the flexible member 150 can be at least partially wrapped about, or coupled with, both the driven roller 120 and the idler roller 140, while the pressure roller 140 is urged into forcible rolling engagement with the driven roller. More specifically, with the pressure roller 140 being rotatably supported by the chassis 110 such that the location of the driven roller axis 122 is fixed relative to the chassis, and with the pressure roller axis 142 being located substantially between and in line with the driven roller axis and the idler roller axis 132, it can be appreciated that application of a force provided by the biasing member 190 to urge the idler roller support member 133, and thus the idler roller 130, away from the pressure roller can cause the flexible member 150 to pull the driven roller 120 against the pressure roller to thus tension the flexible member.

With reference now to both FIGS. 1 and 3, it is seen that, on the one hand in regard to the apparatus 100, the biasing member 190 can be employed to urge the pressure roller 140 into forcible rolling engagement with the driven roller 120 to thereby urge the driven roller in a direction away from the idler roller 130, the location of which remains fixed relative to the chassis.

On the other hand in regard to the apparatus 200, the biasing member 190 can be employed to urge the idler roller 130 away from the pressure roller 140, the location of which remains fixed relative to the chassis 110, wherein the driven roller 120 is drawn into forcible rolling engagement with the pressure roller. However, in regard to both the apparatus 100 and the apparatus 200, the flexible member 150 can be tensioned by a force provided by the biasing member 190.

Thus, inasmuch as it is understood that the driven roller 120 can include various components such as bearings (not shown), shafts (not shown), and the like which are typically associated with conventional rollers and/or pulleys, it can be appreciated from the above discussion with reference to the accompanying figures that the use of the pressure roller 140 in the manner described herein can result in significantly lower levels of stress and strain in such bearings, shafts, and other components that can be associated with the driven roller and/or a mechanical power source (not shown).

That is, conventional driven rollers and/or mechanical power sources, in addition to being subjected to stress and strain as the result of torque applied thereto by way of the application of mechanical power, can also be subjected to bending stress and/or shear stress as the result of tension in the flexible member. The combination of such stresses from both the application of mechanical power and tension in the flexible member can have a significant impact on the strength requirements of the various components associated with the driven roller and/or mechanical power source.

However, as can be appreciated from the above discussion, the use of the pressure roller 140 as described herein can reduce such strength requirements to a considerable degree because, in accordance with the various embodiments of the present invention, the tensioning force applied to the flexible member 150 by the biasing member 190 can be transferred through the driven roller 120 and to the pressure roller 140 by way of the respective circumferential surfaces 121 and 141 rather than through various shafts and or bearings typically associated with the operation of conventional driven rollers and/or mechanical power sources. Thus, such shafts and/or bearings, in accordance with one or more embodiments of the present invention, can be subjected substantially only to stresses imposed by the application of mechanical power for operational rotation of the driven roller.

In accordance with yet another embodiment of the present invention, a method of tensioning a flexible member in an imaging device can include providing a, chassis, a driven roller supported by the chassis, an idler roller supported by the chassis, and a pressure roller. The driven roller and the idler roller are engaged, or coupled, with the flexible member as in the manner described above with regard to the apparatus 100 and 200. Furthermore, the driven roller is movably supported by the chassis as in the manner described above.

Also in accordance with the method, the pressure roller is urged into forcible rolling engagement with the driven roller in facilitation of tensioning of the flexible member. That is, as is described above with regard to the apparatus 100 and 200, the pressure roller and the driven roller can be forced against one another in rolling engagement therewith, wherein such forcible rolling engagement results in tensioning of the flexible member.

In accordance with the method, the forcible engagement of the driven roller and the pressure roller can be accomplished by holding the idler roller in a fixed location while moving the pressure roller into forcible rolling engagement with the driven roller. Alternatively, the forcible engagement of the driven roller and the pressure roller can be accomplished by holding the pressure roller in a fixed location while forcibly moving the idler roller in a direction away from the pressure roller, whereby the driven roller is pulled by the flexible member into forcible rolling engagement with the pressure roller.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An imaging apparatus, comprising:

a chassis;

a first roller supported by the chassis, wherein the first roller is configured to be driven;

a second roller supported by the chassis;

a carriage movably supported by the chassis;

a flexible member coupled with the first roller, the second roller, and the carriage; and, a third roller supported by the chassis, wherein the third roller is in direct physical forcible rolling engagement with the first roller, wherein an axis of rotation of at least one of the first and third rollers is movable relative to the chassis.

2. The apparatus of claim 1, and further comprising a guide supported on the chassis and configured to movably support the carriage.

3. The apparatus of claim 1, and wherein:

a first outer circumferential surface is defined on the first roller;

a second outer circumferential surface is defined on the third roller; and, the second outer surface is in rolling engagement with the first circumferential surface.

4. The apparatus of claim 1, and wherein:

the first roller is configured to rotate relative to the chassis about a first roller axis;

the third roller is configured to rotate relative to the chassis about a third roller axis; and, the first roller axis is substantially parallel to and non-contiguous with the third roller axis.

5. The apparatus of claim 4, and wherein:

the second roller is configured to rotate relative to the chassis about a second roller axis; and, the second roller axis is substantially parallel to the first roller axis and the third roller axis.

6. The apparatus of claim 4, and wherein:

the first roller axis is configured to be movable relative to the chassis; and, the third roller axis is configured to be fixed relative to the chassis.

7. The apparatus of claim 4, and wherein:

the first roller axis is configured to be movable relative to the chassis; and, the third roller axis is configured to be movable relative to the chassis.

8. The apparatus of claim 5, and wherein:

the first roller axis is configured to be movable relative to the chassis;

the second roller axis is configured to be movable relative to the chassis; and, the third roller axis is configured to be fixed relative to the chassis.

9. The apparatus of claim 5, and wherein:

the first roller axis is configured to be movable relative to the chassis;

the third roller axis is configured to be movable relative to the chassis; and, the second axis is configured to be fixed relative to the chassis.

10. The apparatus of claim 1, and further comprising a first roller support member movably supported by the chassis, wherein the first roller is rotatably supported by the first roller support member.

11. The apparatus of claim 1, and further comprising a second roller support member movably supported by the chassis, wherein the second roller is rotatably supported by the second roller support member.

12. The apparatus of claim 11, and wherein the third roller is rotatable about a third roller axis that is substantially fixed relative to the chassis.

13. The apparatus of claim 1, and further comprising a third roller support member movably supported by the chassis, wherein the third roller is rotatably supported by the third roller support member.

14. The apparatus of claim 13, and further comprising a biasing member connected to the third roller support member and configured to urge the third roller into contact with the first roller and away from the second roller.

15. The apparatus of claim 14, and wherein the second roller is rotatable about a second roller axis that is substantially fixed relative to the chassis.

16. The apparatus of claim 1, and wherein the third roller is located substantially between the first roller and the second roller.

17. The apparatus of claim 16, and wherein:

the first roller is rotatable about a first roller axis;

the second roller is rotatable about a second roller axis;

the third roller is rotatable about a third roller axis; and, the first roller axis, the second roller axis, and the third roller axis are substantially aligned with one another.

18. The apparatus of claim 1, and wherein the flexible member is a substantially smooth friction belt.

19. The apparatus of claim 1, and wherein the flexible member is one of a wire or a cable.

20. The apparatus of claim 1, and wherein the flexible member is a toothed synchronous belt.

21. A print head drive system for use in an imaging device having a chassis, the system comprising:

a first roller support member movably supported by the chassis;

a first roller rotatably supported by the first roller support member, wherein the first roller is configured to be driven;

a second roller rotatably supported by the chassis;

a carriage movably supported by the chassis;

a flexible member operationally engaged with the first roller, the second roller, and the carriage; and, a third roller rotatably supported by the chassis, wherein the third roller is in direct forcible rolling contact with the first roller.

22. The system of claim 21, and further comprising a second roller support member movably supported by the chassis, wherein the second roller is rotatably supported by the second roller support member.

23. The system of claim 22, and wherein the third roller is rotatable about a third roller axis that is substantially fixed relative to the chassis.

24. The system of claim 21, and further comprising a third roller support member movably supported by the chassis, wherein the third roller is rotatably supported by the third roller support member.

25. The system of claim 24, and further comprising a biasing member connected to the third roller support member and configured to urge the third roller into forcible rolling engagement with the first roller and away from the second roller.

26. The system of claim 25, and wherein the second roller is rotatable about an axis of rotation that is substantially fixed relative to the chassis.

27. The system of claim 21, and wherein the third roller is located substantially between the first roller and the second roller.

28. The system of claim 21, and wherein:

the first roller is rotatable about a first roller axis;

the second roller is rotatable about a second roller axis;

the third roller is rotatable about a third roller axis; and, the first roller axis, the second roller axis, and the third roller axis are substantially coplanar.

29. The system of claim 21, and wherein the flexible member is a substantially smooth friction belt.

30. The system of claim 21, and wherein the flexible member is one of a wire or a cable.

31. The system of claim 21, and wherein the flexible member is a toothed synchronous belt.

32. A method of tensioning a flexible member of an imaging device, the method comprising:

coupling first and second rollers with a flexible member; and, biasing a third roller directly against the first roller to tension the flexible member.

33. The method of claim 32, and further comprising rotatably driving the first roller to circulate the flexible member about the first and second rollers.

34. An imaging apparatus, comprising:

a flexible member;

a first roller engaged with the flexible member;

a second roller engaged with the flexible member;

a third roller is in direct physical forcible rolling engagement with the first roller; and, a means for forcibly urging the first roller and the third roller into rolling contact with one another.

35. The apparatus of claim 34, and wherein the means comprises a biasing member configured to urge the second roller away from the first roller.

36. The apparatus of claim 34, and wherein the means comprises a biasing member configured to urge the third roller away from the second roller.

37. An imaging apparatus, comprising:

a flexible member;

a first roller coupled with the flexible member;

a second roller coupled with the flexible member;

a third roller having an absence of contact with the flexible member; and, means for biasing the third roller against the first roller to tension the flexible member.

38. The apparatus of claim 37, and wherein one of the first roller and the second roller is configured to be driven to circulate the flexible member about the first and second rollers.

39. A print head drive system, comprising:

a flexible member;

a first roller coupled with the flexible member;

a second roller coupled with the flexible member;

a third roller is in direct physical forcible rolling engagement with the first roller; and, means for biasing the third roller into contact with the first roller to tension the flexible member.

40. The system of claim 39, and wherein one of the first roller and the second roller is configured to be driven to circulate the flexible member about the first and second rollers.

* * * * *